United States Patent [19]

Nakano

[11] Patent Number: 4,934,206

[45] Date of Patent: Jun. 19, 1990

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 305,045

[22] Filed: Feb. 2, 1989

[30] Foreign Application Priority Data

Feb. 2, 1988 [JP] Japan .............................. 63-12167[U]

[51] Int. Cl.⁵ ............................................ F16H 15/12
[52] U.S. Cl. ..................................... 74/200; 74/190.5
[58] Field of Search ............................... 74/200, 190.5

[56] References Cited

U.S. PATENT DOCUMENTS

| | | | |
|---|---|---|---|
| 3,430,504 | 3/1969 | Dickenbrock | 74/200 |
| 3,574,289 | 4/1971 | Scheiter | 74/200 XR |
| 4,453,427 | 6/1984 | Kraus et al. | 74/200 |

Primary Examiner—Allan D. Herrmann
Attorney, Agent, or Firm—Foley & Lardner, Schwartz, Jeffery, Schwaab, Mack, Blumenthal & Evans

[57] ABSTRACT

A continuously variable traction roller transmission comprises a first and a second pair of roller carriers, each of said roller carriers a first pulley portion and a second pulley portion which are spaced along an axis which said roller carrier is rotatable about, a first belt drivingly interconnecting the first pulleys of the first pair of roller carriers, a second belt drivingly interconnecting the second pulleys of ones of the first and second pairs of roller carriers, a third belt drivingly interconnecting the second pulleys of the other of the first and second pairs of roller carriers, a fourth belt drivingly interconnecting said first pulleys of said second pair of roller carriers, and a bearing mechanism for rotatably supporting each of the first and second pairs of roller carriers at a portion between the first and second pulley portions thereof.

4 Claims, 3 Drawing Sheets

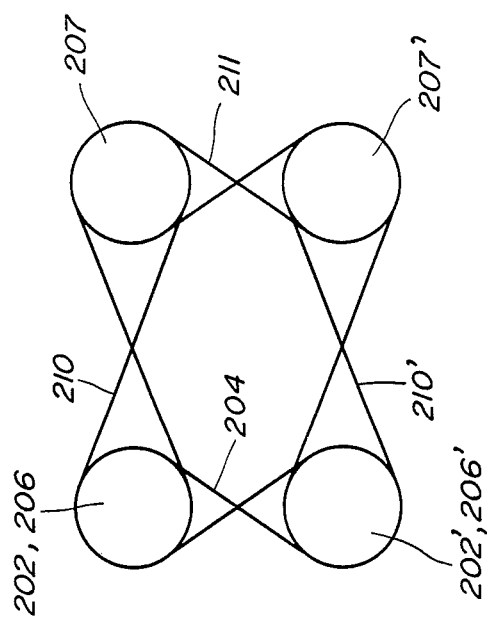

4,934,206

CONTINUOUSLY VARIABLE TRACTION ROLLER TRANSMISSION

BACKGROUND OF THE INVENTION

The present invention relates to a continuously variable traction roller transmission.

U.S. Pat. No. 4,453,427 (Kraus et al.) discloses a continuously variable traction roller transmission. This known transmission includes an input toric element, an output toric element, and a pair of traction rollers disposed between the input and output toric elements and in contact with them. By altering the states where the rollers engage contact with the input and output toric elements, the speed ratio between the input and output toric elements is varied. Each of the rollers is supported by a roller carrier that is rotatable about spindles and vertically movable along an axis along which the spindles lie. The contacting states of each of the rollers with the toric elements are altered in response to movement of the associated roller carrier. In order to synchronize rotation of one of the two roller carriers with the other, a belt is drivingly interconnected between them. More specifically, the roller carriers have pulleys which the belts are wound about. This known continuously variable traction roller transmission is of the type which employs a single set of continuously variable transmission.

An object of the present invention is to provide an arrangement with rotations of four roller carriers of two sets of continuously variable transmission mechanisms of a continuously variable traction roller transmission.

SUMMARY OF THE INVENTION

According to the present invention, there is provided a continuously variable traction roller transmission, which has therein a casing, and a first pair of roller carriers rotatably supported by said casing and rotatably supporting a pair of first traction rollers which are in contact with a first input toric element and a first output toric element.

According to the present invention there is also provided a second pair of roller carriers rotatably supported by the casing and rotatably supporting a pair of second traction rollers which are in contact with a second input toric element and a second output toric element, each of the roller carriers having a first pulley portion and a second pulley portion which are spaced along an axis of which said roller carrier is rotatable about. Also, a plurality of power transmission belts including a first belt drivingly interconnecting said first pulley portion of the first pair of roller carriers, a second belt drivingly interconnecting the second pulley portions of one of the first and second pairs of roller carriers, a third belt drivingly interconnecting the second pulleys of the other of the first and second pairs of roller carriers, and a fourth belt drivingly interconnecting the first pulleys of the second pair of roller carriers, and a bearing mechanism fixedly supported by said casing for rotatable supporting each of the first and second pairs of roller carriers at a portion between the first and second pulley portions thereof.

BRIEF DESCRIPTION OF THE DRAWINGS

Fig. 3 illustrates how wires interconnect pulleys on roller carriers.

DETAILED DESCRIPTION OF THE INVENTION

Figure 1:
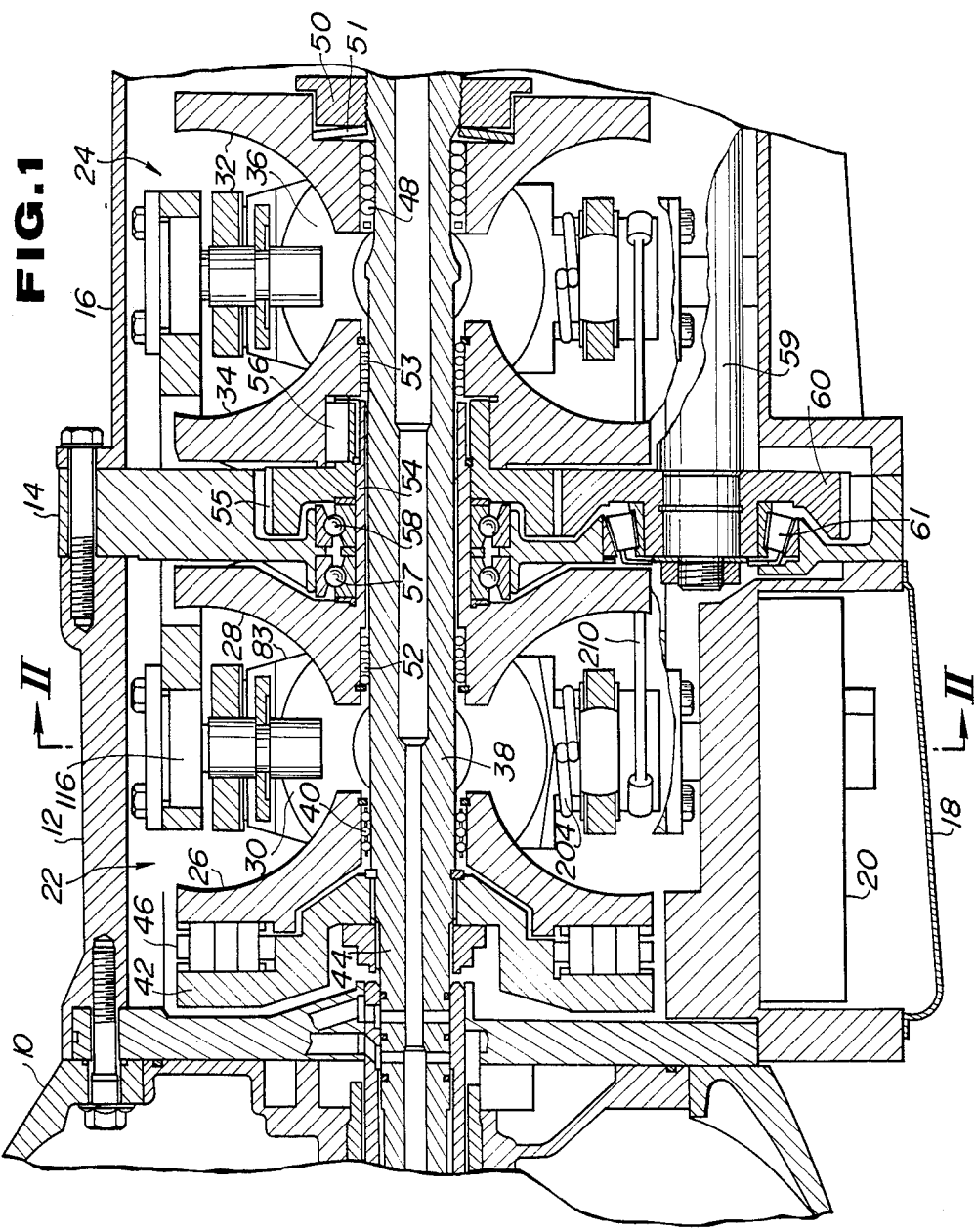
FIg. 1 is a fragmentary axial section of an embodiment of a continuously variable traction roller transmission according to the present invention.
Figure 2:
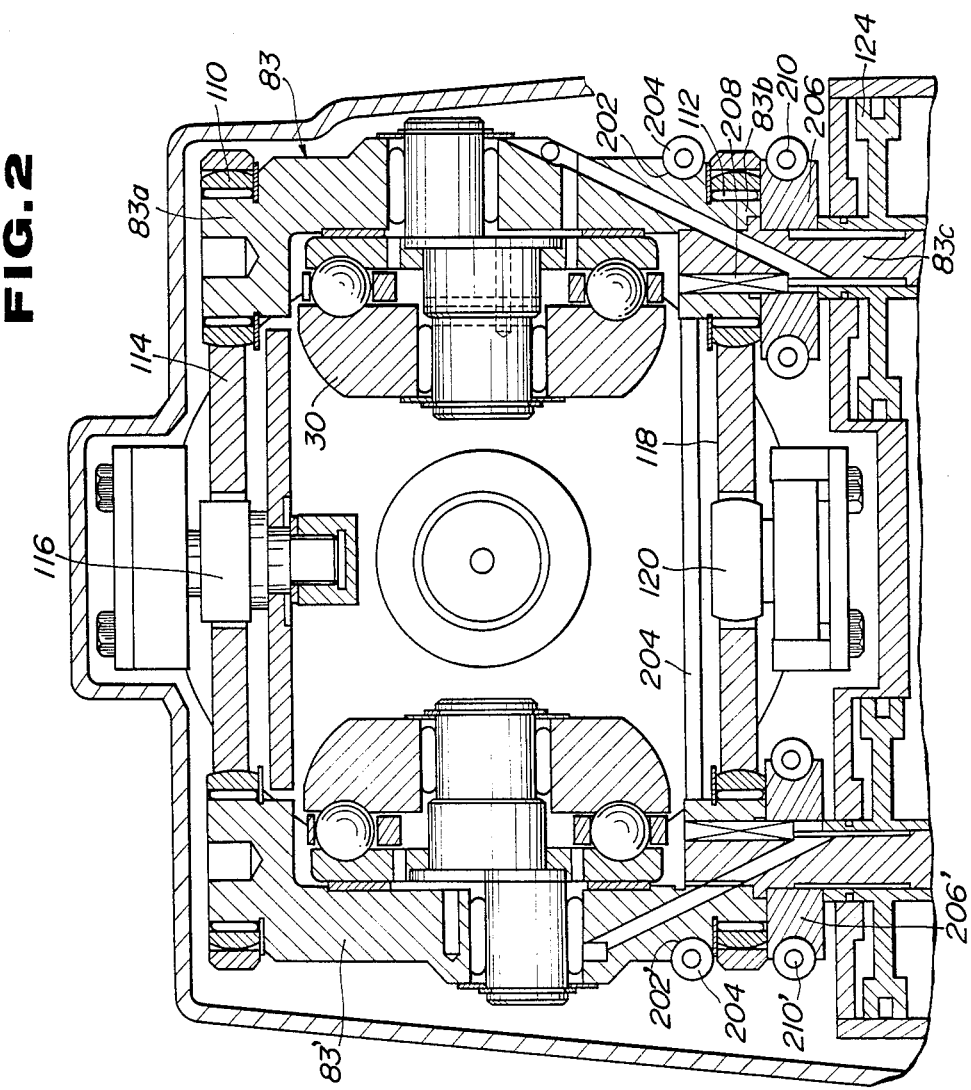
FIG. 2 is a cross section taken through the line II—II in FIG. 1.

Referring to FIGS. 1 to 3, an embodiment of a continuously variable traction roller transmission according to the present invention is described. The transmission comprises a casing that includes a housing 10, a front case 12, a flange 14, and a rear case 16 which are secured by bolts one after another. The flange 14 defines a partition wall between the front and rear cases 12 and 16. Attached to the bottom of the front case 12 is an oil pan 18. Arranged within a chamber defined by the oil pan 18 and the bottom of the front case 12 is a control valve assembly 20. Arranged within the front case 12 is a first continuously variable transmission train 22, while arranged within the rear case 16 is a second continuously variable transmission train 24 which is similar to the first continuously variable transmission train 22.

The first continuously variable transmission train 22 comprises an input toric element 26, an output toric element 28, and a friction roller 30. The input and output toric elements 26 and 28 have toroidal surfaces which the friction roller 30 comes in contact with. Varying states where the friction roller 30 comes in contact with the input and output toric elements causes a ratio of the revolution speed of the input toric element 26 to the revolution speed of the output toric element 28 to vary in a continuous manner. The second continuously variable transmission trail 24 comprises an input toric element 32, an output toric element 34, and a friction roller 36 similar to the first continuously variable transmission train 22. The outut toric elements 28 and 34 of the first and second continuously variable transmission trains 22 and 24 are disposed nearer the flange 14 than their associate input toric elements 26 and 32.

The input toric element 26 is supported on an input shaft 38 via a ball bearing 40. THe input shaft 38 extends into the housing 10 and it is drivingly connected with a turbine runner of a torque converter whose pump impeller is drivingly connected with an output shaft of an engine. Arranged on the back side of the input toric element 26 is a cam flange 42 splined to the input shaft 38. The axial movement of the cam flange 42 along in the input shaft 38 is limited by a nut 44. The cam flange 42 and the input toric element 26 have cam surfaces, respectively, which are opposite to each other with a cam roller 46 interposed therebetween. The cam roller 46 is so configured and arranged as to bias the input toric element 26 toward the output toric element 28 when the input toric element 26 rotates relative to the cam flange 42. The input toric element 32 of the second continuously variable transmission train 24 is coupled with the input shaft 38 via a ball spline 48. The input toric element 32 is biased toward the outer toric element 34 by an initially coned disc spring 51 disposed between the back of the input toric element 32 and a loading nut 50 threadedly engaged with the input shaft 38. The output toric element 28 of the first continuously variable transmission train 22 is rotatably supported on the input shaft 38 via a ball bearing 52. Similarly, the output toric element 34 of the second continuously variable transmission train 24 is rotatably supported on the input shaft 38 via a ball bearing 53. The output toric element 28 has an integral sleeve 54 extending toward the output toric element 34 which a driver gear 55 is splined to for a unitary rotation with the output toric element 28. The driver gear 55 is drivingly connected to the output toric element 34 for a unitary rotation therewith by means of a key 56. The sleeve 54 has an outer peripheral surface supported on the flange 14 via two tandem arranged angular bearings 57 and 58. The driver gear 55 meshes with a follower gear 60 splined to an output shaft 59 which is rotatably supported in the casing in parallel to the input shaft 38. The following gear 60 is rotatably supported on the flange 14 by a taper roller bearing 61.

FIG. 2 shows a cross section taken through the line II—II of FIG. 1. As viewed in FIG. 2, a roller carrier 83 has an upper spindle 83a supported by a needle bearing 110, and a lower spindle 83b supported by a needle bearing 112. The needle bearing 110 is supported by a link 114 which in turn is supported by a link post 116 fixed to the casing. Similarly, the needle bearing 112 is supported by a link 118 which in turn is supported by a link post 120. The roller carrier 83 has a spindle extension 83c connected by a key 208 to the lower spindle 83b for unitary rotation therewith. The spindle extension 83c slidably extends through a sleeve of a servo postion 124. The servo pistion 124 is displaceable along the spindle extension 83c in response to a difference in pressure between an upper chamber and a lower chamber defined by the radial portion of the servo piston 124. Th roller carrier 83 is formed with a pulley groove 202 in which a belt 204 fits. Belt 204 also fits also in a pulley groove 202', which a roller carrier 83' of the first continuously variable transmission mechanism 22 is formed with. The belt 204 is tensioned between the pulley grooves 202 and 202'. In FIG. 2, the pulley groove 202 is disposed adjacent the upper end of the needle bearing 112, and a pulley 206 is disposed adjacent to the lower end of the needle bearing 112. The pulley 206 is connected by the before-mentioned key 208 to the spindle extension 83c for unitary rotation therewith. Thus, with the same key 208, the spindle extension 83c is connected to the spindle 83b, and the pulley is connected to the spindle extension 83c. Pulley 206 is wound by the belt 210. As shown in FIG. 1, belt 210 winds the counterpart pulley 207 of the second continuously variable transmission mechanism 24 as and extends between the pulley 206 of the first continously variable transmission mechanism 22 and its counterpart of the second continuously variable transmission mechanism 24. On the other hand, the other roller carrier 83' is provided with a pulley 206' which is wound by a belt 210'. Belt 210' extends toward and winds the counterpart pulley, 207' of the second continuously variable transmission 24. The second continuously variable transmission mechanism 24 has a similar construction to that of the first continuously variable transmission 22. As shown in FIG. 3, belts 204, 210, 210' and 211 drivingly interconnect the two of the four roller carriers. Each of the belts is crossed as shown in FIG. 3.

When the roller carrier 83 moves vertically as viewed in FIG. 2 owing to the vertical movement of the servo piston 124 responsive to a pressure differential between the upper and lower chambers, the state where the roller 30 contacts the input toric element 26 and the state where it contacts with the output toric element 28 vary, and thr roller carrier 83 rotates with the spindles 83a and 83b as an axis of rotation. The action of this kind takes place with respect to each of the four roller carriers. Since the adjacent two roller carriers are interconnected by the belt, the rotations of the roller carriers are synchronized. With this arrangement, therefore, the states where each of the traction rollers contacts the adjacent input toric element and the output toric element becomes uniform. Since, the pulleys, 206 and 206', of each of the roller carriers are disposed on the opposite end of the needle bearing, such as one denoted by 112, which the lower spindle is rotatably supported by, the upper spindle, such as one denoted by 83a, is less subject to binding stress caused by tensions on the belts winding the pulleys. Thus, the movement of each of the roller carriers owing to the associated servo piston, such as one denoted by 124, is not hampered. Lastly, since the belts interconnect the roller carriers as shown in FIG. 3, the syncronous actions of the roller carriers are maintained even if one of the belts is cut.

What is claimed is:

1. A continuously variable traction roller transmission, comprising:
   a casing;
   a first pair of roller carriers rotatably supported by said casing and rotably supporting a pair of first traction rollers which are in contact with a first input toric element and a first output toric element;
   a second pair of roller carriers rotatably supported by said casing and rotably supporting a pair of second traction rollers which are in contact with a second input toric element and a second output toric element;
   each of said roller carriers having comprises a first pulley portion and a second pulley portion which are spaced along an axis about which said roller carrier rotates;
   a plurality of power transmission belts including a first belt drivingly interconnecting ones of said first pulley portions of said first pair of roller carriers, a second belt drivingly interconnecting said second pulley portions of one of said first and second pairs of roller carriers, a third belt drivingly interconnecting said second pulleys of the other of said first and second pairs of roller carriers, and a fourth belt drivingly interconnecting said first pulleys of said second pair of roller carriers; and
   a bearing mechanism fixedly supported by said casing for rotatably supporting each of said first and second pairs of roller carriers at a portion between said first and second pulley portions thereof.

2. A continuously variable traction roller transmission as claimed in claim 1, wherein each of said belts is crossed.

3. A continuously variable traction roller transmission as claimed in claim 1, wherein each of said belts is a wire.

4. A continuously variable traction roller transmission as claimed in claim 1, wherein said bearing mechanism includes needle bearing means.

* * * * *